(12) United States Patent
Jenkins

(10) Patent No.: US 12,172,610 B1
(45) Date of Patent: Dec. 24, 2024

(54) HEATED VEHICLE ACCESSORIES

(71) Applicant: Cortez Jenkins, South Bend, IN (US)

(72) Inventor: Cortez Jenkins, South Bend, IN (US)

( * ) Notice: Subject to any disclaimer, the term of this patent is extended or adjusted under 35 U.S.C. 154(b) by 746 days.

(21) Appl. No.: 17/398,089

(22) Filed: Aug. 10, 2021

(51) Int. Cl.
  *B60S 1/66* (2006.01)
  *B62D 25/04* (2006.01)
  *B62D 25/18* (2006.01)

(52) U.S. Cl.
  CPC ............... *B60S 1/66* (2013.01); *B62D 25/04* (2013.01); *B62D 25/18* (2013.01)

(58) Field of Classification Search
  CPC ....... H05B 3/145; B32B 27/22; B32B 27/285; B32B 27/288; B32B 3/06; B29K 2507/04
  See application file for complete search history.

(56) References Cited

U.S. PATENT DOCUMENTS

| | | |
|---|---|---|
| 2,325,901 A | 8/1943 | Atkinson |
| 5,573,686 A | 11/1996 | Lavicska |
| 5,697,645 A | 12/1997 | Nagler |
| 6,021,843 A | 2/2000 | Roach |
| 6,140,609 A | 10/2000 | Jones |
| 8,556,297 B2 | 10/2013 | Uehara |
| 2003/0106883 A1* | 6/2003 | Sangwan ................ H05B 3/84 219/203 |
| 2003/0141289 A1 | 7/2003 | Fisher |
| 2008/0083719 A1 | 4/2008 | Bartucco |
| 2008/0296279 A1 | 12/2008 | Forrest |
| 2012/0296567 A1* | 11/2012 | Breed ..................... E05F 15/77 701/468 |
| 2019/0308591 A1* | 10/2019 | Salter ..................... B32B 27/22 |

FOREIGN PATENT DOCUMENTS

CA        2164917 A1    6/1997

* cited by examiner

*Primary Examiner* — Thien S Tran

(57) ABSTRACT

The heated vehicle accessory incorporates a vehicle and a control circuit. The control system mounts on the vehicle. The control system detects the accumulation of snow and ice on the vehicle. The control circuit draws electric energy from the vehicle. The control circuit converts the drawn electric energy into heat that is used to melt the accumulation of snow and ice from critical location on the vehicle.

9 Claims, 6 Drawing Sheets

HEATED VEHICLE ACCESSORIES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of removal of ice and snow from a vehicle. (B60S1/00)

SUMMARY OF INVENTION

The heated vehicle accessory comprises a vehicle and a control circuit. The control system mounts on the vehicle. The control system detects the accumulation of snow and ice on the vehicle. The control circuit draws electric energy from the vehicle. The control circuit converts the drawn electric energy into heat that is used to melt the accumulation of snow and ice from one or more critical locations on the vehicle.

These together with additional objects, features and advantages of the heated vehicle accessory will be readily apparent to those of ordinary skill in the art upon reading the following detailed description of the presently preferred, but nonetheless illustrative, embodiments when taken in conjunction with the accompanying drawings.

In this respect, before explaining the current embodiments of the heated vehicle accessory in detail, it is to be understood that the heated vehicle accessory is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heated vehicle accessory.

It is therefore important that the claims be regarded as including such equivalent construction insofar as they do not depart from the spirit and scope of the heated vehicle accessory. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
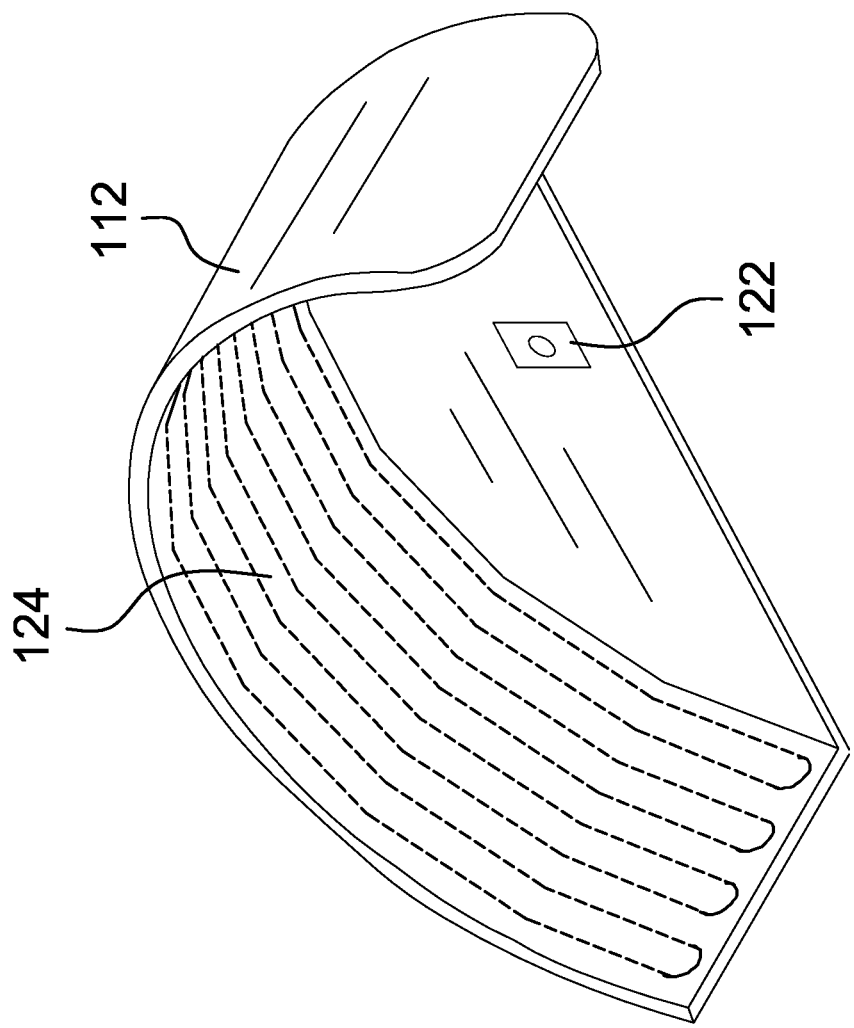
FIG. 1 is a detail view of an embodiment of the disclosure.
Figure 2:
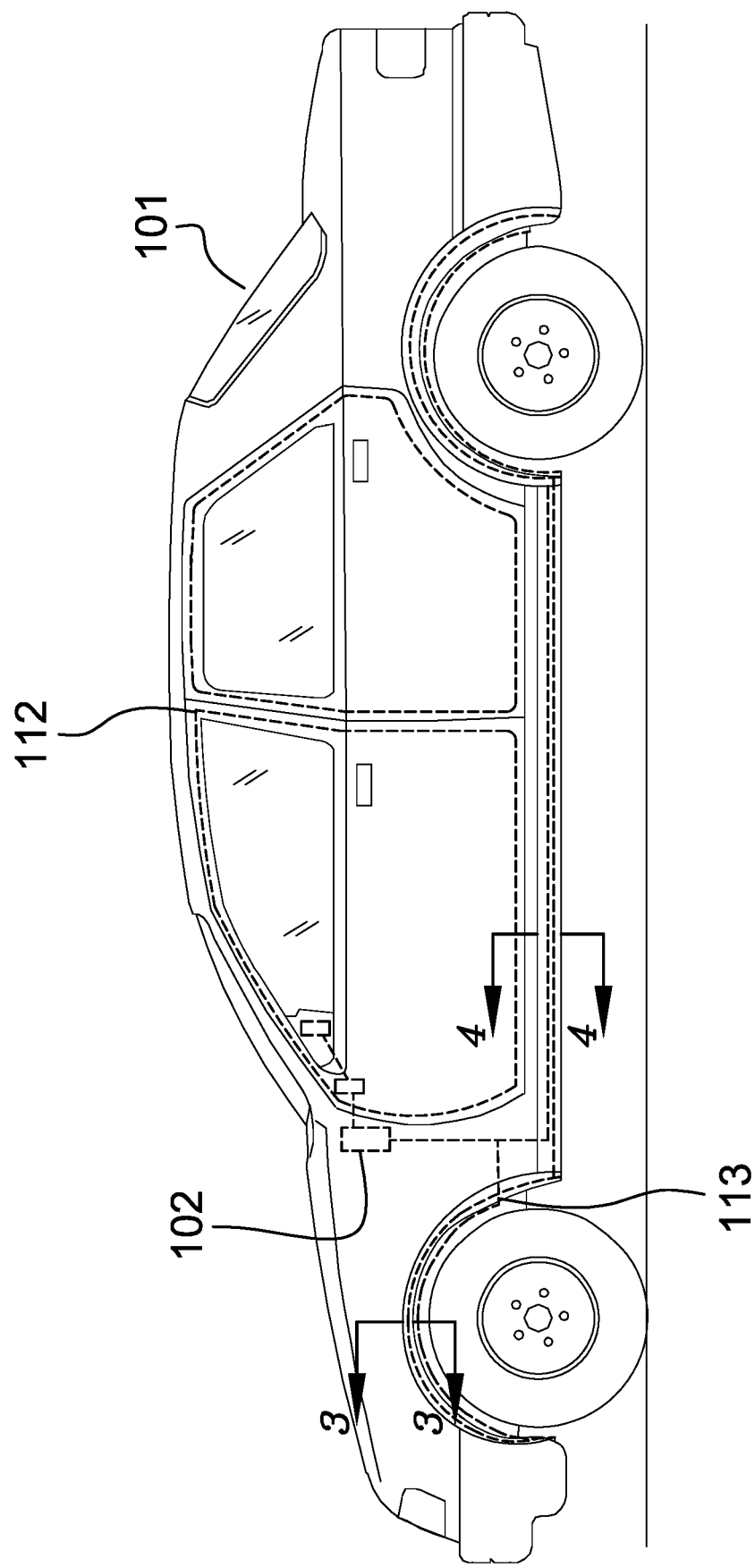
FIG. 2 is a detail view of an embodiment of the disclosure.
Figure 4:
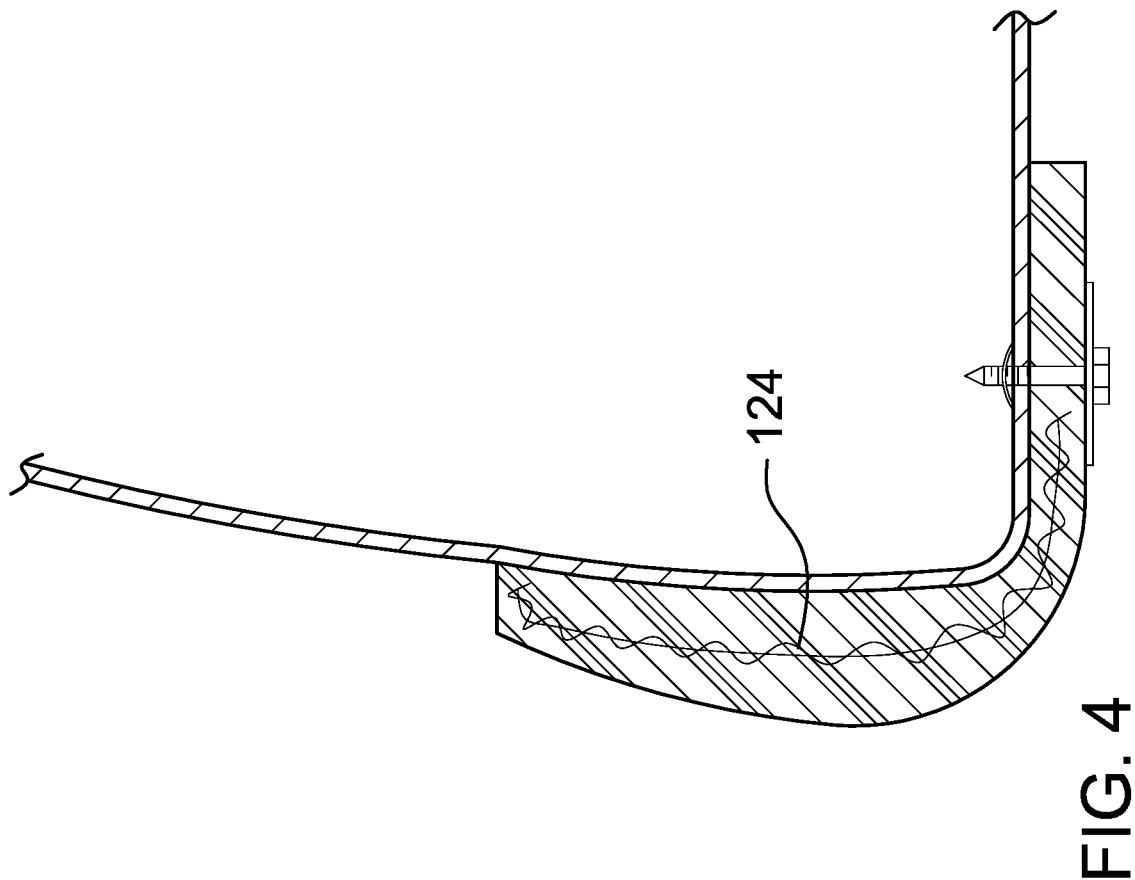
FIG. 4 is a detail view of an embodiment of the disclosure.
Figure 3:
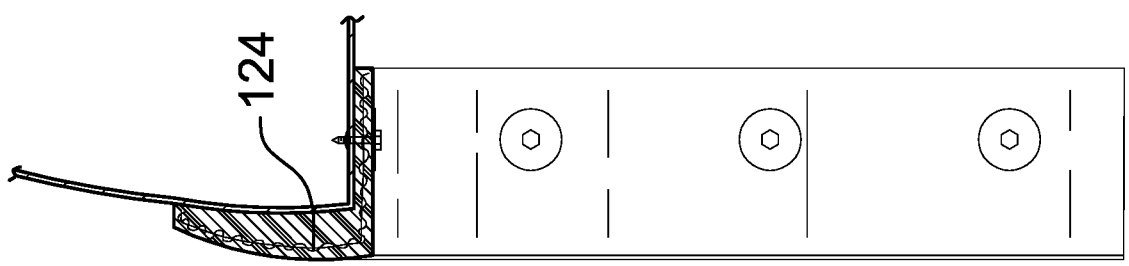
FIG. 3 is a detail view of an embodiment of the disclosure.
Figure 5:
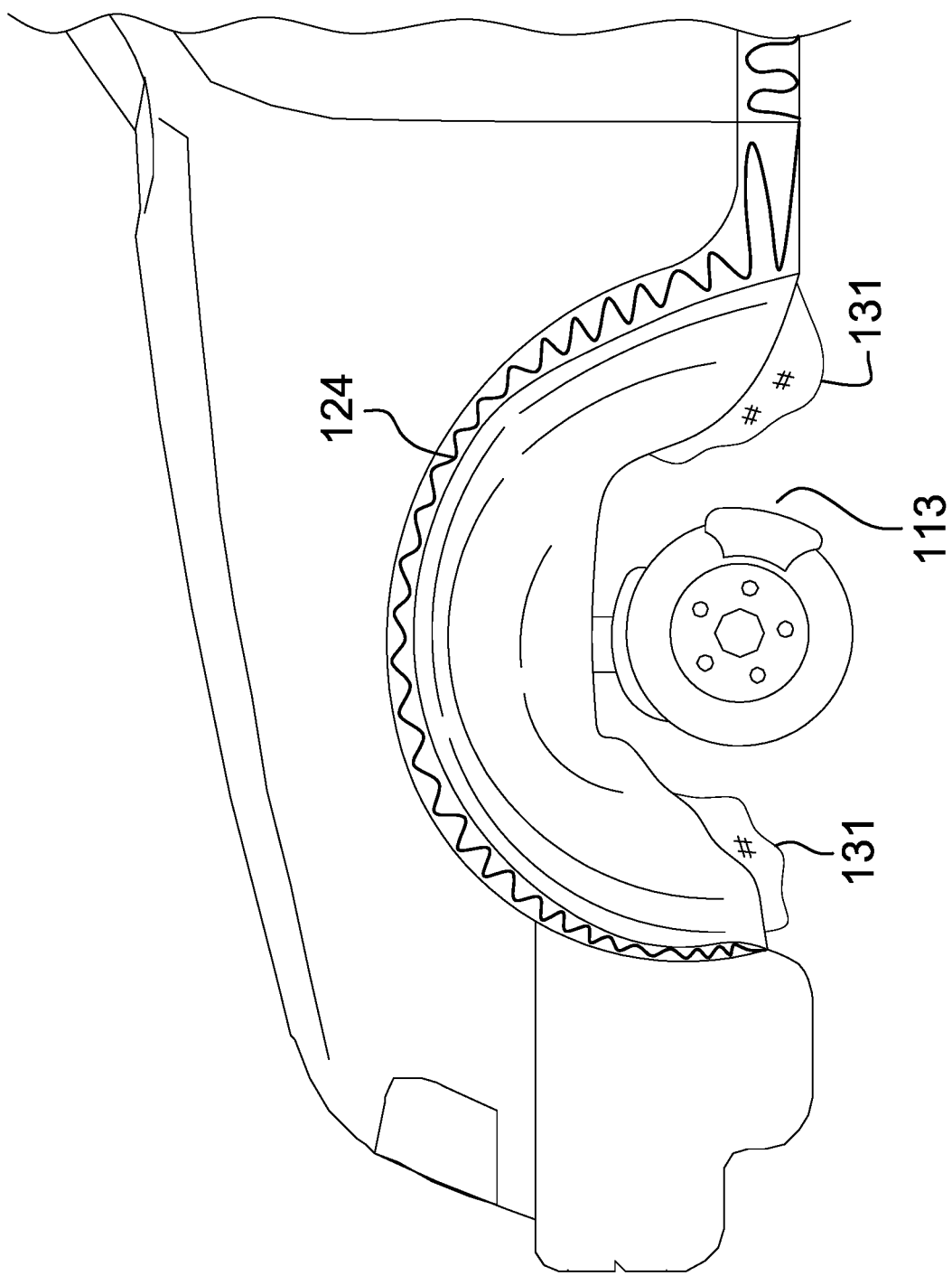
FIG. 5 is a detail view of an embodiment of the disclosure.
Figure 6:
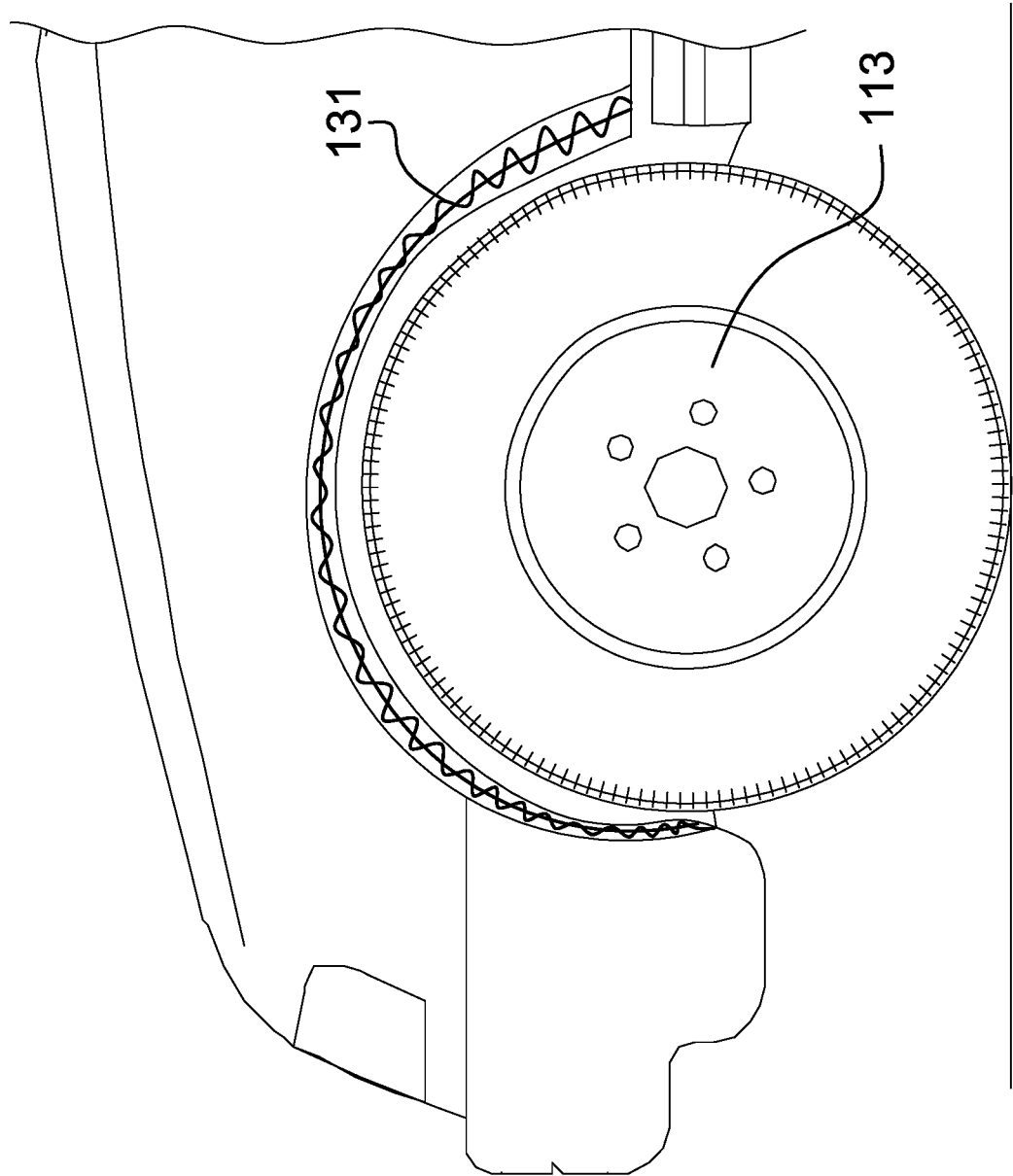
FIG. 6 is a detail view of an embodiment of the disclosure.
Figure 7:
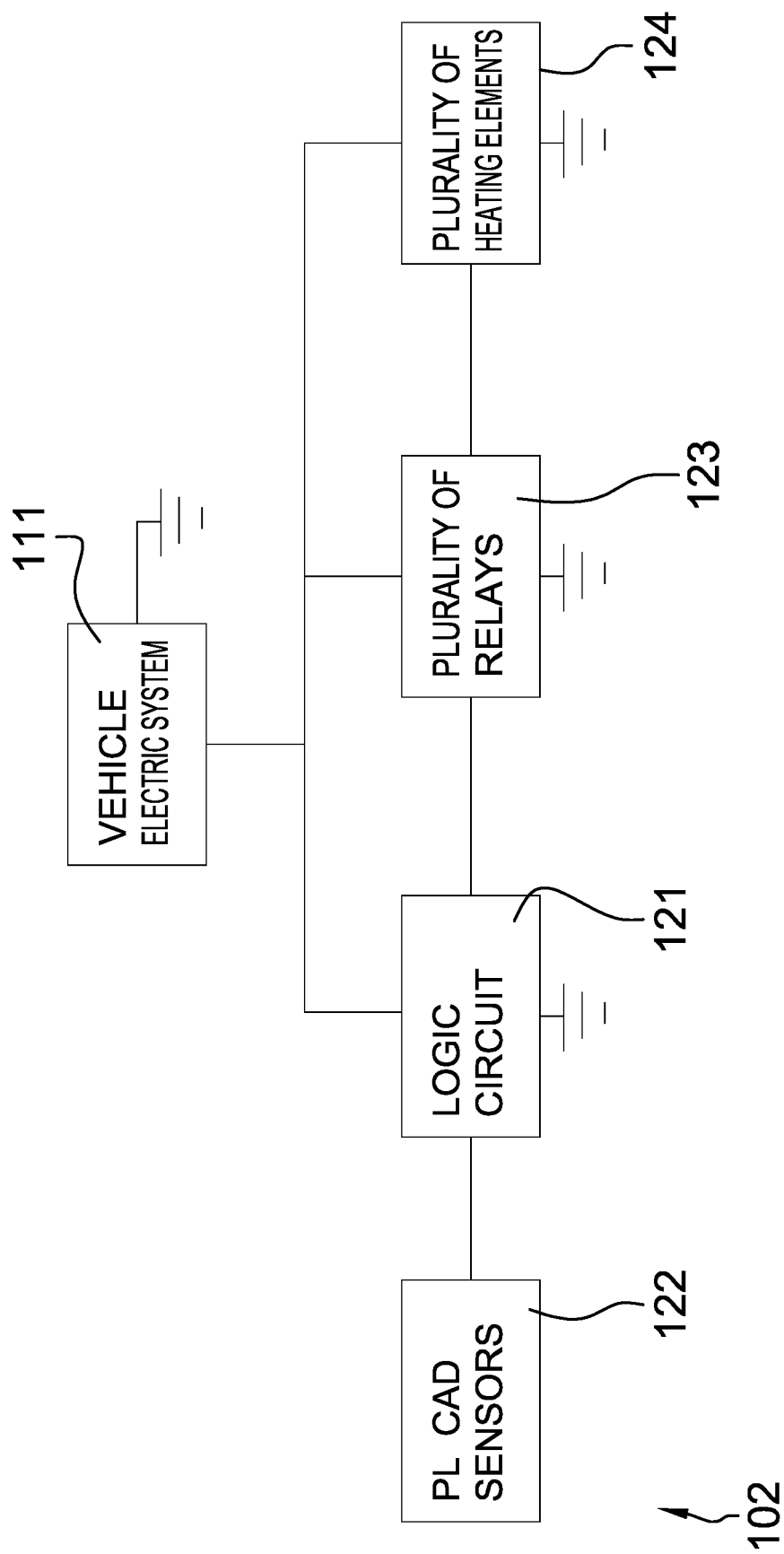
FIG. 7 is a block diagram of an embodiment of the disclosure.

Detailed reference will now be made to one or more potential embodiments of the disclosure, which are illustrated in FIGS. 1 through 7.

The heated vehicle accessory 100 (hereinafter invention) comprises a vehicle 101 and a control circuit 102. The control system mounts on the vehicle 101. The control system detects the accumulation of snow and ice 131 on the vehicle 101. The control circuit 102 draws electric energy from the vehicle 101. The control circuit 102 converts the drawn electric energy into heat that is used to melt the accumulation of snow and ice 131 from one or more critical locations on the vehicle 101.

The vehicle 101 is a motorized vehicle 101. The vehicle 101 transports cargo and passengers over a road network. The vehicle 101 is defined elsewhere in this disclosure. The vehicle 101 comprises a vehicle 101 electric system 111, a plurality of vehicle 101 door ports 112, and a plurality of vehicle 101 wheel wells 113.

The vehicle 101 electric system 111 is a source of DC electric energy. The vehicle 101 electric system 111 is provisioned with the vehicle 101. The control circuit 102 forms an electric connection with the vehicle 101 electric system 111 such that the control circuit 102 draws electric energy from the vehicle 101 electric system 111.

Each of the plurality of vehicle 101 door ports 112 is a port that is formed in the cab of the vehicle 101. Each of the plurality of vehicle 101 door ports 112 provides access into the cab of the vehicle 101. Access through each door port selected from the plurality of vehicle 101 door ports 112 is controlled by a door that mounts within the selected door port.

The plurality of vehicle 101 wheel wells 113 is a semi-enclosed structure that is formed within the chassis of the vehicle 101. There is a one to one correspondence between the wheels of the vehicle 101 and the plurality of vehicle 101 wheel wells 113. Each wheel well selected from the plurality of vehicle 101 wheel wells 113 has a wheel mounted in it. Each wheel well selected from the plurality of vehicle 101 wheel wells 113 forms a protected space that partially surrounds the wheel selected to mount in the selected wheel well.

The control circuit 102 is an electric circuit. The control circuit 102 controls the operation of the invention 100. The control circuit 102 monitors the vehicle 101 for an accumulation of snow and ice 131. The control circuit 102 draws electric energy from the vehicle 101 electric system 111. The control circuit 102 converts the drawn electric energy into heat that is used to melt the accumulation of snow and ice 131 on the vehicle 101. The control circuit 102 comprises a logic circuit 121, a plurality of capacitive sensors 122, a plurality of relays 123, and a plurality of heating elements 124. The logic circuit 121, the plurality of capacitive sensors 122, the plurality of relays 123, and the plurality of heating elements 124 are electrically interconnected.

The logic circuit 121 is an electric circuit. The logic circuit 121 controls the operation of the control circuit 102. The logic circuit 121 monitors each capacitive sensor selected from the plurality of capacitive sensors 122. The logic circuit 121 determines whether any capacitive sensor selected from the plurality of capacitive sensors 122 detects the presence of an accumulation of snow and ice 131.

The logic circuit 121 controls the operation of each heating element selected from the plurality of heating elements 124. The plurality of heating elements 124 are independently controlled by the logic circuit 121. By independently controlled is meant that the operation of any first heating element selected from the plurality of heating elements 124 does not depend on the operating status of any second heating element selected from the plurality of heating elements 124.

The logic circuit 121 controls the operation of each relay selected from the plurality of relays 123. The plurality of relays 123 are independently controlled by the logic circuit 121. By independently controlled is meant that the operation of any first relay selected from the plurality of relays 123 does not depend on the operating status of any second relay selected from the plurality of relays 123.

Each of the plurality of capacitive sensors 122 is a capacitive sensor. The capacitive sensor is defined elsewhere in this disclosure. Each capacitive sensor selected from the plurality of capacitive sensors 122 mounts at a location of the vehicle 101 selected from the group consisting of: a) a door port selected from the plurality of vehicle 101 door ports 112; and, b) a wheel well selected from the plurality of vehicle 101 wheel wells 113. Each door port selected from the plurality of vehicle 101 door ports 112 receives a capacitive sensor selected from the plurality of capacitive sensors 122. Each wheel well selected from the plurality of vehicle 101 wheel wells 113 receives a capacitive sensor selected from the plurality of capacitive sensors 122.

Each capacitive sensor selected from the plurality of capacitive sensors 122 detects the accumulation of snow and ice 131 at the location monitored by the selected capacitive sensor. The logic circuit 121 independently monitors each capacitive sensor selected from the plurality of capacitive sensors 122. The logic circuit 121 evaluates the readings from each selected capacitive sensor to determine if there is an accumulation of snow and ice 131 at the location of the selected capacitive sensor that is associated with the location of the selected capacitive sensor. When the logic circuit 121 determines that a selected capacitive sensor has detected an accumulation of snow and ice 131, the logic circuit 121 initiates the operation of the heating element selected from the plurality of heating elements 124 that is associated with the location of the selected capacitive sensor.

Each relay selected from the plurality of relays 123 is an electrically controlled switch. The relay is defined elsewhere in this disclosure. There is a one to one correspondence between the plurality of relays 123 and the plurality of heating elements 124. Each relay selected from the plurality of relays 123 controls the flow of electric energy from the vehicle 101 electric system 111 into the heating element selected from the plurality of heating elements 124 that is associated with the selected relay. The logic circuit 121 independently controls each relay selected from the plurality of relays 123. The logic circuit 121 actuates a relay selected from the plurality of relays 123 to the closed position in order to provide electricity to the heating element selected from the plurality of heating elements 124 that is associated with the selected relay. The logic circuit 121 subsequently actuates the selected relay to the open position in order to discontinue the flow of electric energy through the selected heating element that is associated with the selected relay.

Each heating element selected from the plurality of heating elements 124 is a heating element. The heating element is defined elsewhere in this disclosure. There is a one to one correspondence between the plurality of heating elements 124 and the plurality of relays 123. Each heating element selected from the plurality of heating elements 124 converts the flow of electric energy drawn from the vehicle 101 electric system 111 into heat used to melt the accumulation of snow and ice 131 from the location monitored by the capacitive sensor selected from the plurality of capacitive sensors 122 that is associated with the selected heat sensor. The logic circuit 121 independently controls each heating element selected from the plurality of heating elements 124. The logic circuit 121 controls the operation of each heating element selected from the plurality of heating elements 124 by controlling the relay selected from the plurality of relays 123 that is associated with the selected heat sensor.

The following definitions were used in this disclosure:

Capacitive Sensor: As used in this disclosure, a capacitive sensor is an electric device that detects any changes of capacitance (specifically, changes in the dielectric field) that occurs within the sensitivity of the capacitive sensor. The capacitive sensor are often used detect an object that enters into a region or that touches or accumulates on a surface. The capacitive sensor is often used to detect accumulations of ice.

Chassis: As used in this disclosure, a chassis is a wheeled structure that is used to transport an attached load.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Door: As used in this disclosure, a door is a movable or removable barrier that is attached to a chamber for the purpose of allowing or preventing access through an aperture into the chamber.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Port: As used in this disclosure, a port is an opening formed in a first object that allows a second object to pass through a boundary formed by the first object.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A heated vehicle accessory comprising
a vehicle and a control circuit;
wherein the control circuit mounts on the vehicle;
wherein the control circuit detects the accumulation of snow and ice on the vehicle;

wherein the control circuit draws electric energy from the vehicle;
wherein the control circuit converts the drawn electric energy into heat that is used to melt an accumulation of snow and ice from one or more critical locations on the vehicle;
wherein the vehicle comprises a vehicle electric system, a plurality of vehicle door ports, and a plurality of vehicle wheel wells;
wherein the vehicle electric system is a source of dc electric energy;
wherein the vehicle electric system is provisioned with the vehicle;
wherein the control circuit comprises a logic circuit, a plurality of capacitive sensors, a plurality of relays, and a plurality of heating elements;
wherein the logic circuit, the plurality of capacitive sensors, the plurality of relays, and the plurality of heating elements are electrically interconnected;
wherein the logic circuit determines whether any capacitive sensor selected from the plurality of capacitive sensors detects the presence of an accumulation of snow and ice;
wherein the logic circuit monitors each capacitive sensor selected from the plurality of capacitive sensors;
wherein the plurality of heating elements are independently controlled by the logic circuit;
wherein the logic circuit controls an operation of each heating element selected from the plurality of heating elements;
wherein by independently controlled is meant that the operation of any first heating element selected from the plurality of heating elements does not depend on an operating status of any second heating element selected from the plurality of heating elements;
wherein each capacitive sensor selected from the plurality of capacitive sensors detects the accumulation of snow and ice at a location monitored by the selected capacitive sensor;
wherein the logic circuit independently monitors each capacitive sensor selected from the plurality of capacitive sensors;
wherein the logic circuit evaluates readings from each selected capacitive sensor to determine if there is an accumulation of snow and ice at the location of the selected capacitive sensor that is associated with the location of the selected capacitive sensor;
wherein when the logic circuit determines that a selected capacitive sensor has detected an accumulation of snow and ice, the logic circuit initiates the operation of the heating element selected from the plurality of heating elements that is associated with the location of the selected capacitive sensor.

2. The heated vehicle accessory according to claim 1
wherein each of the plurality of vehicle door ports is a port that is formed in a cab of the vehicle;
wherein each of the plurality of vehicle door ports provides access into the cab of the vehicle;
wherein access through each door port selected from the plurality of vehicle door ports is controlled by a door that mounts within the selected door port;
wherein the plurality of vehicle wheel wells is a semi-enclosed structure that is formed within a chassis of the vehicle;
wherein there is a one to one correspondence between the wheels of the vehicle and the plurality of vehicle wheel wells;
wherein each wheel well selected from the plurality of vehicle wheel wells has a wheel mounted in it;
wherein each wheel well selected from the plurality of vehicle wheel wells forms a protected space that partially surrounds the wheel selected to mount in the selected wheel well.

3. The heated vehicle accessory according to claim 2 wherein the control circuit forms an electric connection with the vehicle electric system such that the control circuit draws electric energy from the vehicle electric system.

4. The heated vehicle accessory according to claim 3
wherein the control circuit is an electric circuit;
wherein the control circuit controls an operation of the heated vehicle accessory;
wherein the control circuit monitors the vehicle for an accumulation of snow and ice;
wherein the control circuit converts the drawn electric energy into heat that is used to melt the accumulation of snow and ice on the vehicle.

5. The heated vehicle accessory according to claim 4
wherein the logic circuit is an electric circuit;
wherein the logic circuit controls an operation of the control circuit;
wherein the logic circuit controls the operation of each relay selected from the plurality of relays.

6. The heated vehicle accessory according to claim 1
wherein the plurality of relays are independently controlled by the logic circuit;
wherein by independently controlled is meant that the operation of any first relay selected from the plurality of relays does not depend on an operating status of any second relay selected from the plurality of relays.

7. The heated vehicle accessory according to claim 6
wherein each of the plurality of capacitive sensors is a capacitive sensor;
wherein each capacitive sensor selected from the plurality of capacitive sensors mounts at a location of the vehicle selected from the group consisting of: a) a door port selected from the plurality of vehicle door ports; and, b) a wheel well selected from the plurality of vehicle wheel wells;
wherein each door port selected from the plurality of vehicle door ports receives a capacitive sensor selected from the plurality of capacitive sensors;
wherein each wheel well selected from the plurality of vehicle wheel wells receives a capacitive sensor selected from the plurality of capacitive sensors.

8. The heated vehicle accessory according to claim 7
wherein each relay selected from the plurality of relays is an electrically controlled switch;
wherein there is a one to one correspondence between the plurality of relays and the plurality of heating elements;
wherein each relay selected from the plurality of relays controls a flow of electric energy from the vehicle electric system into the heating element selected from the plurality of heating elements that is associated with the selected relay;
wherein the logic circuit independently controls each relay selected from the plurality of relays;
wherein the logic circuit actuates a relay selected from the plurality of relays to a closed position in order to provide electricity to the heating element selected from the plurality of heating elements that is associated with the selected relay;
wherein the logic circuit subsequently actuates the selected relay to an open position in order to discontinue the flow of electric energy through the selected heating element that is associated with the selected relay.

9. The heated vehicle accessory according to claim 8 wherein each heating element selected from the plurality of heating elements is a heating element;
wherein there is a one to one correspondence between the plurality of heating elements and the plurality of relays;
wherein each heating element selected from the plurality of heating elements converts the flow of electric energy drawn from the vehicle electric system into heat used to melt the accumulation of snow and ice from the location monitored by the capacitive sensor selected from the plurality of capacitive sensors that is associated with a selected heat sensor;
wherein the logic circuit independently controls each heating element selected from the plurality of heating elements;
wherein the logic circuit controls the operation of each heating element selected from the plurality of heating elements by controlling the relay selected from the plurality of relays that is associated with the selected heat sensor.

* * * * *